United States Patent [19]

Fujimura et al.

[11] Patent Number: 4,623,840

[45] Date of Patent: Nov. 18, 1986

[54] ACTUATOR

[75] Inventors: Tadato Fujimura, Tokyo; Tsutomu Fujii, Kawasaki, both of Japan

[73] Assignees: K.K. Tokyo Koki Seizosho; Institute of Science and Engineering Service, Inc., both of Tokyo, Japan; part interest to each

[21] Appl. No.: 627,905

[22] Filed: Jul. 5, 1984

[30] Foreign Application Priority Data

Jul. 5, 1983 [JP] Japan .................. 58-103503[U]

[51] Int. Cl.[4] .................................................. G01B 7/14
[52] U.S. Cl. ..................................... 324/208; 336/136; 324/207
[58] Field of Search .................. 336/136, 30; 324/207, 324/208, 59; 73/168; 340/870.31

[56] References Cited

U.S. PATENT DOCUMENTS

| 2,495,157 | 1/1950 | Browne, Jr. | 324/208 |
|---|---|---|---|
| 3,234,491 | 2/1966 | Baur | 336/136 |
| 3,235,790 | 2/1966 | Callins | 324/208 |
| 3,281,809 | 10/1966 | Andersson | 324/208 |
| 3,356,933 | 12/1967 | Stettler | 336/136 |
| 3,376,533 | 4/1968 | Chass | 336/136 |
| 3,546,648 | 12/1970 | Chass | 336/136 |
| 3,654,549 | 4/1972 | Maurer et al. | 324/208 |
| 3,745,386 | 7/1973 | Lloyd | 336/136 |
| 3,891,918 | 6/1975 | Ellis | 324/208 |
| 4,119,911 | 10/1978 | Johnson, Jr. | 324/208 |
| 4,134,065 | 1/1979 | Bauer et al. | 336/136 |
| 4,282,485 | 8/1981 | Pauwels et al. | 324/208 |
| 4,297,698 | 10/1981 | Pauwels | 336/136 |
| 4,339,739 | 7/1982 | Drow | 336/136 |
| 4,413,245 | 11/1983 | Bartholmäus et al. | 336/136 |
| 4,471,304 | 9/1984 | Wolf | 324/208 |

FOREIGN PATENT DOCUMENTS

| 549911 | 4/1956 | France | 324/208 |
|---|---|---|---|
| 28350 | 3/1977 | Japan | 324/208 |
| 1288601 | 9/1972 | United Kingdom | 336/136 |

Primary Examiner—Stephen A. Kreitman
Assistant Examiner—Hezron E. Williams
Attorney, Agent, or Firm—Wenderoth, Lind & Ponack

[57] ABSTRACT

An actuator has a cylindrical body, on the outer peripheral surface of which an induction coil is formed directly and a piston accommodated in the body and functioning as a core. The displacement of the piston can be detected by a detecting circuit for the change of the coil inductance in response to the displacement of the piston.

4 Claims, 4 Drawing Figures

ACTUATOR

BACKGROUND OF THE INVENTION

This invention relates to an actuator operated by oil or compressed air and more particularly to a cylindrical actuator with a mechanism for detecting displacement of a piston moving in the actuator.

In general, servo-motors or hydraulic or pneumatic cylinders have often been used for actuating the arms of industrial robots. The servo-motors are used, in many cases, for controlling accurately the arms thereof because a feed back control can be easily carried out.

On the contrary, in the case of the hydraulic or pneumatic cylinders, as displacement of pistons moving in the cylinders cannot be detected accurately, the cylinders are mainly used for robots requiring a simple movement.

However, it is generally understood that the hydraulic or pneumatic cylinders are more suitable for actuators generating a relatively large amount of force than the servo-motors.

The Japanese Utility Model Laid Open Publication 16489/1980 discloses a cylindrical actuator with a mechanism for detecting displacement of its piston. In the Publication, the piston detecting displacement mechanism has a cylindrical detecting body which may form an induction coil and a core moving in the body. The detecting body and the core are accommodated in a hole formed through the center portion of a piston rod with a piston which is adapted to move in an outer casing. The core is fixed to the piston rod while the detecting body is fixed to the casing. In this construction, when the core is moved together with the piston, the relative positional relationship between the core and the detecting body is changed. The displacement of the piston, at that time, is detected on the basis of the change of the coil inductance.

In this arrangement, however, because the detecting body and the core are accommodated in the piston rod, the overall volume of the conventional actuator unavoidably becomes bulky.

SUMMARY OF THE INVENTION

It is an object of this invention to provide an actuator which is provided with a mechanism for detecting precisely displacement of a piston moving in the actuator so that the actuator can be accurately controlled and which can generate a relatively large force in spite of its compact construction.

According to this invention, there is provided an actuator in which a piston with a piston rod is accommodated in a cylindrical body of the actuator so as to be movable under the pressure of fluid fed into the cylindrical body while the displacement of the piston is detected by detecting means, characterized in that the cylindrical body is made of non-magnetic substance, that a wire is wound directly on the outer peripheral surface of the cylindrical body without insulating material between the outer surface thereof and the wire to form an induction coil and that the change of the inductance of the coil in response to the displacement of the piston functioning as a core is detected by a detecting circuit.

The nature, utility, and further features of this invention will be more clearly apparent from the following detailed description of preferred embodiment of the invention when read in conjunction with the accompaying drawings briefly described below.

DETAILED DESCRIPTION OF THE INVENTION

Figure 1:
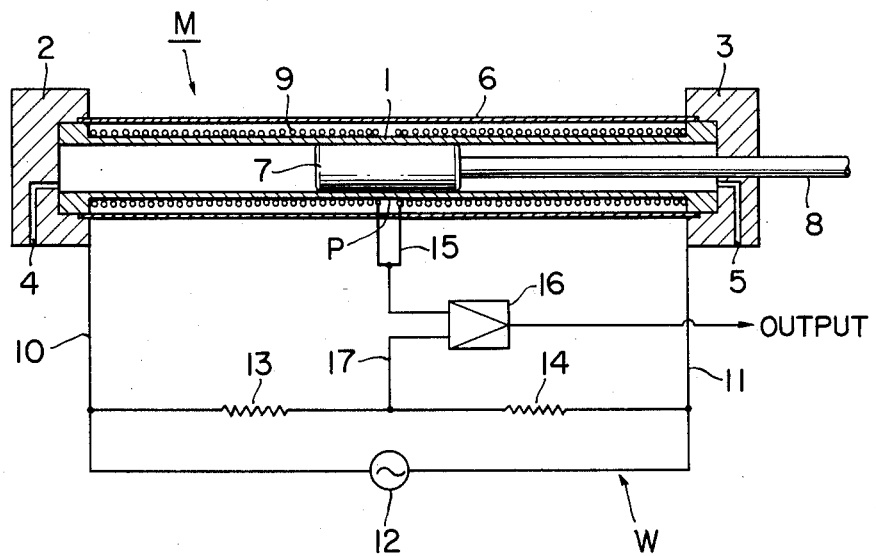
FIG. 1 is a schematic view showing a construction of this invention, including a longitudinal sectional view of a cylindrical actuation and a detecting circuit diagram.

Referring to FIG. 1, a cylindrical actuator M has a cylindrical body 1 made of non-magnetic substance such as carbon-fiber reinforced non-magnetic material, silicon-carbide, phenol-formaldehyde (Bake-lite) or boron-carbide. The cylindrical body 1 functions as an actuating cylinder and a bobbin for winding a coil. To the opposite ends of the body 1 are fixed two end members 2, 3 which are provided with two ports 4, 5, respectively. The cylindrical body 1 is covered with a cylindrical cover 6 which is also fixed to the end members 2, 3 at its opposite ends.

In the cylindrical body 1 is accommodated a piston 7 which also functions as a core. The piston 7 is made of magnetic substance such as permalloy (Ni45%) and is fixedly connected to one end of a piston-rod 8 which passes through the right end member 5 as viewed in FIG. 1. The other end of the piston-rod 8 is connected with an operating member such as an arm of a robot (not shown).

On the outer peripheral surface of the cylindrical body is directly wound a nichrome wire so as to form a one-layer winding coil 9 which functions as an inductance coil. From the opposite ends of the coil 9 extend two lead wires 10, 11 between which a power source 12 and two resistances 13, 14 are provided, respectively, while a line 15 extends from the middle point P of the coil 9 in its axial direction. The line 15 is connected with an amplifier 16 to which a line 17 extending from the middle point P between the two resistances 13, 14 is also connected. The above circuit forms a well known Wheatstone bridge circuit W and the displacement of the piston 7 from the middle point P of the coil 9 or cylindrical body 1 can be indicated as the change of an output signal from the Wheatstone bridge circuit W.

Figure 2:
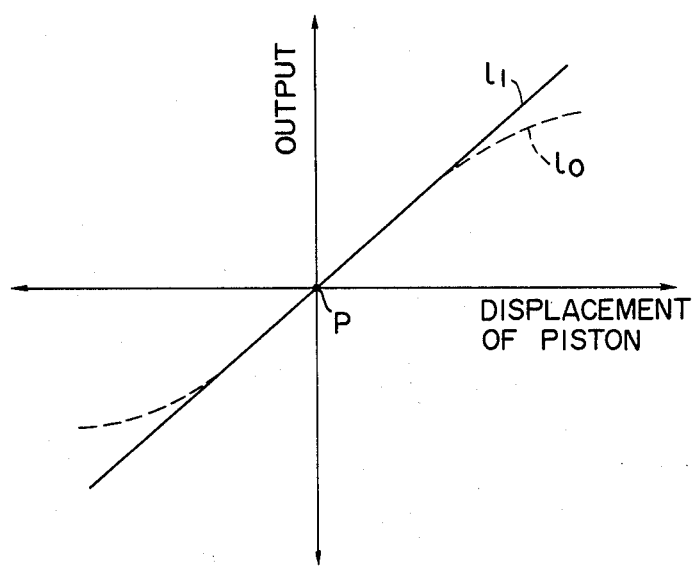
FIG. 2 is a diagram showing a relationship between the displacement of the piston of the actuator and the output of the detecting circuit.
Figure 3:
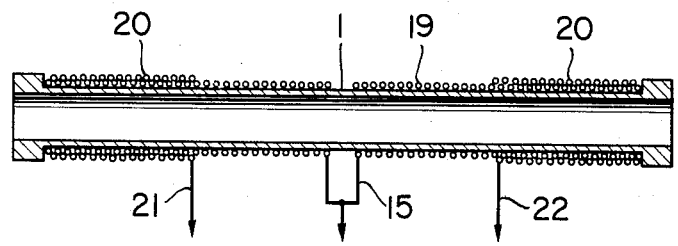
FIG. 3 is a longitudinal sectional view of the actuator showing another way of winding a wire to form an induction coil.

FIG. 2 shows a relationship between the displacement of the piston 9 from the middle point P of the coil 9 or cylindrical body 1 and the output from the circuit W. When the one-layer winding of the wire is formed on the outer peripheral surface of the body 1, magnetic flux density near the opposite end portions of the coil 9 is smaller than that near the middle portion of the coil 9. Accordingly, at the opposite end portions thereof, the output obtained is not in proportion to the displacement of the piston 7 as indicated by the dotted line lo which is curved in FIG. 2.

To solve this problem, two second-layer windings 20, 20 of the wire may be respectively formed near the opposite end portions of the outer peripheral surface of the body 1 so that the output obtained is in proportion to the displacement of the piston 7 as indicated by the linear line l₁ in FIG. 2. In this case, two lead wires 21, 22 extend from the opposite inner ends of the double-layer windings 20, respectively, to form the same Wheatstone bridge circuit as that of FIG. 1.

Figure 4:
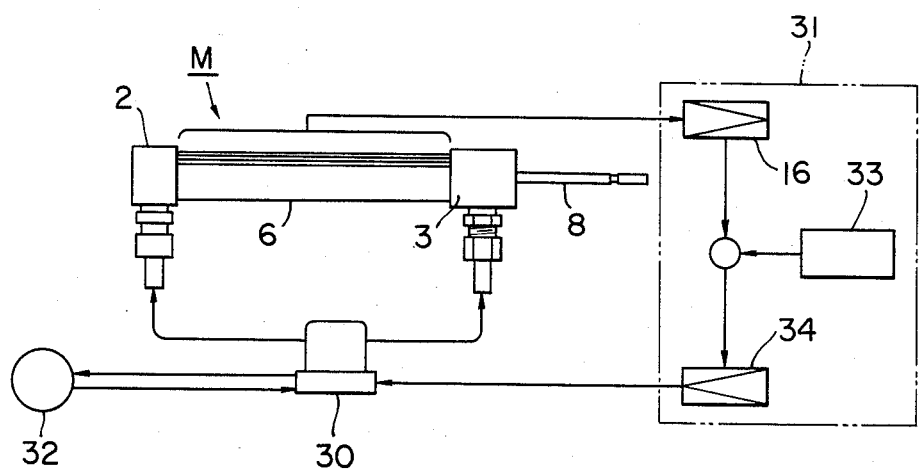
FIG. 4 is a diagram showing a control system for the actuator.

The actuator of this invention is used in association with a servo-valve 30 and a control system 31 as shown in FIG. 4. The servo-valve 30 is connected to a driving source 32 such as a hydraulic motor or air compressor, and the control system 31 comprises an amplifier 16, a signal generator 33 for generating a signal indicating the position of the piston 9, and a servo-amplifier 34. In this control system, the servo-valve 30 is operated in response to a signal from the signal generator 33 to feed fluid from the driving source 32 into the cylindrical body 1 through the port 4 or 5 whereby the piston 9 is moved by the indicated distance in the indicated direction. The displacement of the piston 9 from the middle point P of the coil 9 is always detected, and the piston 9 is stopped when it reaches the indicated position.

In this actuator M, as a wire is wound directly on the outer surface of the body 1 made of non-magnetic material to form an inductance coil without insulating material being present between the cylindrical body 1 and the wire, the wire can be easily wound thereon and the construction of the actuator becomes compact. Furthermore, as the body 1 is made of carbon-fiber, Bakelite or the like which has high strength, the body 1 can function as insulating material as well as the casing of the actuator, whereby the actuator of this invention not only can generate a relatively big force but also can be controlled precisely and accurately by means of the induction type detecting mechanism for detecting the position of the piston 7.

What is claimed is:
1. A pressure fluid operated actuator comprising:
   (a) a cylindrical body made of non-magnetic substance taken from the group consisting of carbon-fiber reinforced non-magnetic material, silicon-carbide, phenol-formaldehyde and boron-carbide and having pressure fluid inlet-outlet means at each end thereof;
   (b) a piston with a piston rod thereon, said piston being slidable in the cylindrical body in substantially fluid tight relationship therewith so as to be movable under the pressure of pressure fluid fed thereinto through one of said inlet-outlet means and for pumping pressure fluid out of said cylindrical body through the other of said outlet means, said piston being of a material for functioning as a core;
   (c) an induction coil directly on the outer peripheral surface of the cylindrical body; and
   (d) circuit means connected to said coil for detecting the change of the inductance of the coil in response to the displacement of the piston.
2. An actuator according to claim 1, wherein the coil is wound in two double-layer windings near the opposite end of the cylindrical body, respectively.
3. An actuator according to claim 1 wherein said piston is made of a permalloy.
4. An actuator as claimed in claim 1 wherein said carbon-fiber reinforced non-magnetic material is carbon-fiber reinforced plastic.

* * * * *